(12) United States Patent
Kocher et al.

(10) Patent No.: US 7,806,033 B2
(45) Date of Patent: Oct. 5, 2010

(54) SAW BLADE

(75) Inventors: Martin Kocher, Solothurn (CH); Daniel Grolimund, Zuchwil (CH); Urs Karlen, Stalden (CH)

(73) Assignee: Scintilla AG, Solothurn (CH)

( * ) Notice: Subject to any disclaimer, the term of this patent is extended or adjusted under 35 U.S.C. 154(b) by 445 days.

(21) Appl. No.: 10/204,374

(22) PCT Filed: Nov. 2, 2001

(86) PCT No.: PCT/EP01/12687

§ 371 (c)(1),
(2), (4) Date: Oct. 15, 2002

(87) PCT Pub. No.: WO02/49793

PCT Pub. Date: Jun. 27, 2002

(65) Prior Publication Data

US 2003/0051593 A1 Mar. 20, 2003

(30) Foreign Application Priority Data

Dec. 20, 2000 (DE) .................. 100 63 567

(51) Int. Cl.
*B27B 33/02* (2006.01)

(52) U.S. Cl. .............. 83/835; 83/846; 83/847; 83/848; 83/849; 83/851

(58) Field of Classification Search .......... 83/835, 83/838, 846–848, 851; D8/20; 30/392–394
See application file for complete search history.

(56) References Cited

U.S. PATENT DOCUMENTS

| | | | | |
|---|---|---|---|---|
| 23,330 A | * | 3/1859 | Wilson | 83/851 |
| 154,104 A | * | 8/1874 | Vosburgh | 83/846 |
| 706,447 A | * | 8/1902 | Peart | 83/848 |
| 1,328,982 A | * | 1/1920 | Calkins | 83/848 |

(Continued)

FOREIGN PATENT DOCUMENTS

CH            693531 A5 *    9/2003

(Continued)

OTHER PUBLICATIONS

Patent Asbtracts of Japan JP 2000271817 Published Oct. 3, 2000.

*Primary Examiner*—Jason Daniel Prone
(74) *Attorney, Agent, or Firm*—Michael J. Striker

(57) ABSTRACT

A sabre saw blade, in particular for metal applications, with a serration that has at least one first tooth spacing and one second tooth spacing, characterized in that in at least a partial region with three first and three second tooth spacings which are always disposed in a directly alternating sequence, the serration has at least two tooth shapes, and at least one tooth is embodied as a roof-shaped tooth having a first tooth back portion with a first clearance angle and a second tooth back portion with a second clearance angle with said tooth back portions being arranged at an obtuse angle and one behind the other in a cutting movement direction, and at least one tooth is embodied as a standard tooth with a straight tooth back, arranged alternatingly, wherein the first tooth spacing is between 10% and 30% shorter and the second tooth spacing is between 10% and 30% wider than 1.81 mm.

8 Claims, 2 Drawing Sheets

U.S. PATENT DOCUMENTS

| | | | |
|---|---|---|---|
| 2,071,618 A | | 2/1937 | Ferrarl |
| 2,141,504 A | * | 12/1938 | Balfour et al. ................ 83/846 |
| 2,603,251 A | * | 7/1952 | Christenson ................ 83/835 |
| 3,171,457 A | * | 3/1965 | Brown ......................... 83/846 |
| 3,292,674 A | | 12/1966 | Turner |
| 4,195,543 A | * | 4/1980 | Tapply et al. ................. 83/847 |
| 4,311,075 A | * | 1/1982 | Sundström ................... 83/848 |
| RE31,433 E | * | 11/1983 | Clark .......................... 83/846 |
| 4,557,172 A | | 12/1985 | Yoneda |
| 4,688,458 A | * | 8/1987 | Krilov ......................... 83/835 |
| 4,920,652 A | * | 5/1990 | Johnson ....................... 83/835 |
| 4,958,546 A | * | 9/1990 | Yoshida et al. ................ 83/848 |
| 5,018,421 A | * | 5/1991 | Lucki et al. ................... 83/835 |
| 5,062,338 A | * | 11/1991 | Baker .......................... 83/848 |
| 5,119,708 A | * | 6/1992 | Musgrove .................... 83/835 |
| 5,231,909 A | * | 8/1993 | Hsu ............................. 83/835 |
| 5,477,763 A | * | 12/1995 | Kullman ...................... 83/846 |
| 5,606,900 A | * | 3/1997 | Stoddard ...................... 83/846 |
| 5,697,280 A | * | 12/1997 | Armstrong et al. ............ 83/848 |
| 5,743,163 A | * | 4/1998 | Lavinder ...................... 83/851 |
| 5,868,058 A | * | 2/1999 | Senegas ....................... 83/835 |
| 5,918,525 A | * | 7/1999 | Schramm ..................... 83/835 |
| D415,401 S | * | 10/1999 | Imboden et al. ................ D8/70 |
| 6,003,422 A | * | 12/1999 | Holston ....................... 83/846 |
| 6,065,380 A | * | 5/2000 | Lundh ......................... 83/847 |
| 6,119,571 A | * | 9/2000 | Hayden, Sr. .................. 83/848 |
| 6,244,152 B1 | * | 6/2001 | Di Nicolantonio ............ 83/835 |
| 6,505,537 B1 | * | 1/2003 | Vöge ........................... 83/835 |
| 6,532,852 B1 | * | 3/2003 | Tsujimoto et al. ............. 83/847 |
| D482,945 S | * | 12/2003 | Grolimund .................... D8/20 |
| 6,681,674 B2 | * | 1/2004 | Hakansson et al. ............ 83/835 |
| 6,883,412 B1 | * | 4/2005 | Turfitt ......................... 83/835 |
| 7,127,979 B2 | * | 10/2006 | Kocher et al. ................. 83/848 |
| 2002/0194975 A1 | * | 12/2002 | Bishop ........................ 83/851 |
| 2003/0116006 A1 | * | 6/2003 | Graf ............................ 83/835 |
| 2003/0177645 A1 | * | 9/2003 | Flury et al. ................... 30/392 |
| 2004/0035282 A1 | * | 2/2004 | Tsujimoto .................... 83/849 |
| 2004/0255749 A1 | * | 12/2004 | Hayden, Sr. ................. 83/835 |
| 2005/0211046 A1 | * | 9/2005 | Thomas et al. ................ 83/855 |
| 2006/0016315 A1 | * | 1/2006 | Zorich et al. ................. 83/835 |
| 2006/0130628 A1 | * | 6/2006 | Rompel et al. ................ 83/835 |
| 2006/0162526 A1 | * | 7/2006 | Nagano et al. ................ 83/835 |
| 2007/0251372 A1 | * | 11/2007 | Petts et al. .................... 83/846 |
| 2008/0121079 A1 | * | 5/2008 | Hashimoto et al. ............ 83/835 |
| 2009/0145280 A1 | * | 6/2009 | Bucks et al. .................. 83/835 |
| 2010/0126328 A1 | * | 5/2010 | Grolimund ................... 83/848 |

FOREIGN PATENT DOCUMENTS

| | | |
|---|---|---|
| DE | 195 01 019 A | 7/1996 |
| DE | 19501019 A1 * | 7/1996 |
| DE | 10300392 A1 * | 7/2004 |
| EP | 1 009 600 A | 6/2000 |
| EP | 1803517 A1 * | 7/2007 |
| FR | 08/29/80 | 8/1980 |
| FR | 2785563 A1 * | 5/2000 |
| JP | 9262759 | 10/1997 |
| JP | 11-082395 | 3/1999 |

* cited by examiner

SAW BLADE

BACKGROUND OF THE INVENTION

The invention is based on saw blade, in particular for metal applications.

In order to be able to machine various materials with a saw, different saw blades are known, which have application-specific serrations, e.g. a constant tooth spacing and/or a vario-serration, etc. A vario-serration has different tooth spacings.

The reference DE 195 01 019 A1 describes a saw blade with a constant tooth spacing and teeth with different tooth shapes. It describes standard teeth, humped teeth, and roof-shaped teeth. The humped teeth with sharply rounded tooth backs or the roof-shaped teeth are used as supporting teeth. By contrast, the standard teeth with straight tooth backs or the humped teeth with low-slope tooth backs are used as aggressively cutting teeth.

If the tooth shapes are disposed in an alternating sequence, the aggressively cutting teeth can be supported by the humped or roof-shaped teeth and the aggressively cutting teeth can be prevented from breaking due to heavy loads.

The alternating tooth shapes can be deflected lateral to the saw blade by corrugation or setting of the saw blade. The corrugation or setting produces a cutting width that is greater than the thickness of the saw blade. A wedging and jamming of the saw blade can be prevented and the cutting behavior can be improved.

SUMMARY OF THE INVENTION

The invention is based on a saw blade, in particular for metal applications, with a serration that has at least a first and a second basic tooth spacing.

The invention proposes that in at least a partial region with three successive basic tooth spacings, the first and second basic tooth spacings are always disposed in a directly alternating sequence: a larger and a smaller basic tooth spacing. An advantageous supporting action for aggressively cutting teeth, a high rate of material removal via the cutting motion, and particularly an advantageous removal of cuttings by means of the larger basic tooth spacing are achieved. A breakage of teeth can be prevented and a long service life can be achieved.

The invention also proposes that the serration include at least two tooth shapes: an aggressively cutting tooth shape and a supporting tooth shape. The aggressively cutting tooth is advantageously constituted by a standard tooth and the supporting tooth is constituted by a roof-shaped or humped tooth. The supporting action can be improved in comparison to a serration with only one tooth shape in that the aggressively cutting tooth is supported by the supporting tooth. Under heavy loads, the supporting tooth can absorb powerful forces and can prevent breakage of the aggressively cutting tooth. In particular, an advantageous supporting action is achieved if, in the direction opposite from the cutting movement direction, the larger basic tooth spacing is followed by a roof-shaped or humped tooth and the smaller basic tooth spacing is followed by a standard tooth.

When there are two different basic tooth spacings and two different tooth shapes, two teeth are advantageously viewed as a single unit and are deflected lateral to the cutting movement direction by means of corrugation and/or setting. The corrugation or setting produces a cutting width that is greater than the thickness of the saw blade. A wedging and jamming of the saw blade can be prevented and the cutting behavior can be improved. Furthermore, it is particularly easy to achieve the fact that in the direction counter to the cutting movement direction, the roof-shaped or humped tooth can always be placed in a protective manner in front of the standard tooth. It has turned out that an advantageous cutting and guide behavior is produced if two units deflected in opposite directions are followed by an undeflected unit.

The serration can also be set or corrugated in other variations deemed useful by one skilled in the art. For example, only the roof-shaped or humped teeth can be deflected to the right and left, lateral to the cutting movement direction, by means of corrugation and/or setting and the standard teeth can remain undeflected, standing straight up on the saw blade.

The invention also proposes that an average of the first and second basic tooth spacing essentially correspond to a standard tooth spacing. The cutting performance and the service life of a saw blade according to the invention can be compared with particular ease to a standard saw blade. It is particularly advantageous to provide a basic tooth spacing with a deviation of ±10% to ±30% from a standard tooth spacing. For example, starting from a conventional standard tooth spacing, if the first basic tooth spacing is increased by 10%, then the second basic tooth spacing is reduced by 10%. The basic tooth spacings can also be embodied with different percentage deviations.

If the basic tooth spacing of the saw blade in the cutting movement direction is embodied with a progressively increasing first and second basic tooth spacing, then this can achieve the fact that materials with different material thicknesses can be machined in an advantageous manner.

The embodiment according to the invention can be used in various saw blades deemed suitable by one skilled in the art for a variety of application fields and materials, such as circular saw blades, sabre saw blades, etc., which can be both manually and machine driven. However, the embodiment according to the invention can be used to particular advantage in highly loaded saw blades that are used in machine tools or hand machine tools, in particular saw blades for metal applications.

BRIEF DESCRIPTION OF THE DRAWINGS

Other advantages ensue from the following description of the drawings. The drawings show an exemplary embodiment of the invention. The drawings, the specification, and the claims contain numerous features in combination. One skilled in the art will also suitably consider the features individually and unite them in other meaningful combinations.

DESCRIPTION OF THE PREFERRED EMBODIMENT

Figure 1:
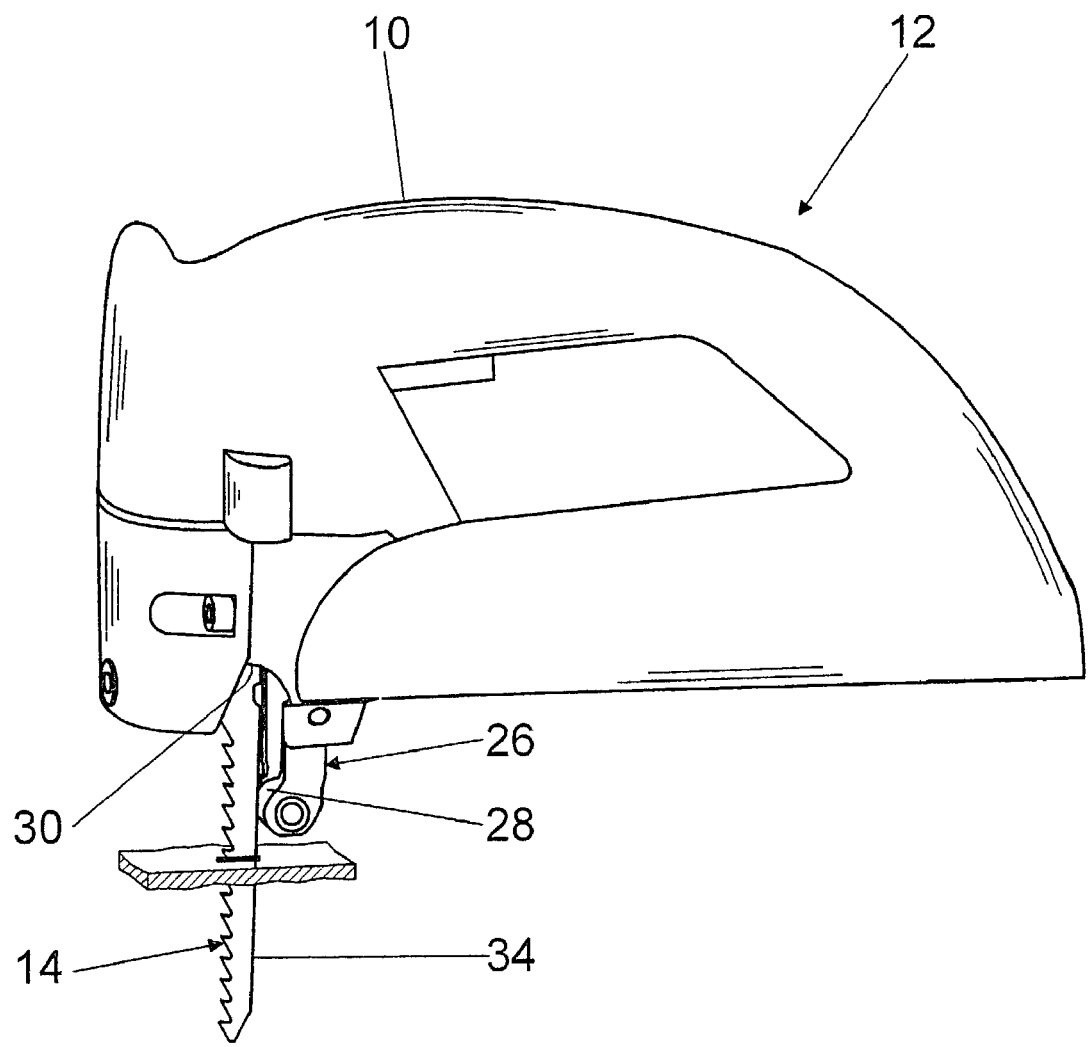
FIG. 1 shows a manually guided, electrically driven sabre saw with a saw blade installed.
Figure 2:
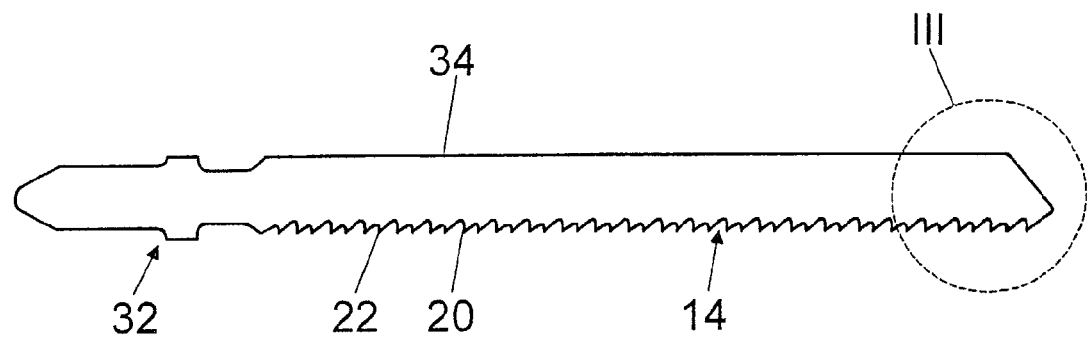
FIG. 2 shows the saw blade from FIG. 1 when it is not installed.

FIG. 1 shows a manually guided sabre saw 12 with an electric motor, not shown, in a housing 10. A saw blade for metal applications is drive connected to the electric motor by means of a tool holding mechanism 30 and is guided by means of a guide unit 26 with a guide roller 28. A shaft 32 is formed onto one end of the saw blade (FIG. 2) and can be used to lock the saw blade into the tool holding mechanism 30. During a sawing operation, the saw blade is driven in a reciprocating movement with a stroke motion perpendicular to a machining direction. The saw blade is supported with its saw blade back 34 in the direction counter to the machining direction resting against the guide roller 28 and is guided in a groove of the guide roller 28 lateral to the machining direction.

Figure 3:
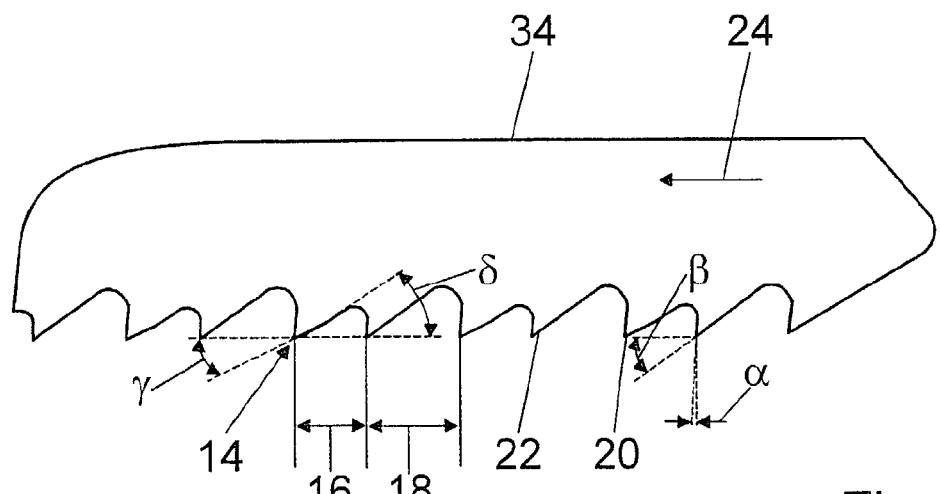
FIG. 3 shows an enlarged detail III from FIG. 2.

The saw blade has a serration 14 with a first basic tooth spacing 16 and a second basic tooth spacing 18; the first basic tooth spacing 16 is smaller than the second basic tooth spacing 18 (FIG. 3). The basic tooth spacings 16, 18 are always disposed in a directly alternating sequence. The serration 14 has two different tooth shapes: a roof-shaped tooth 20 and a standard tooth 22.

The roof-shaped tooth 20 is embodied as a supporting tooth and is always disposed after the larger basic tooth spacing 18 in the direction counter to a cutting movement direction 24. The aggressively cutting standard tooth 22 always follows the smaller basic tooth spacing 16.

Figure 4:
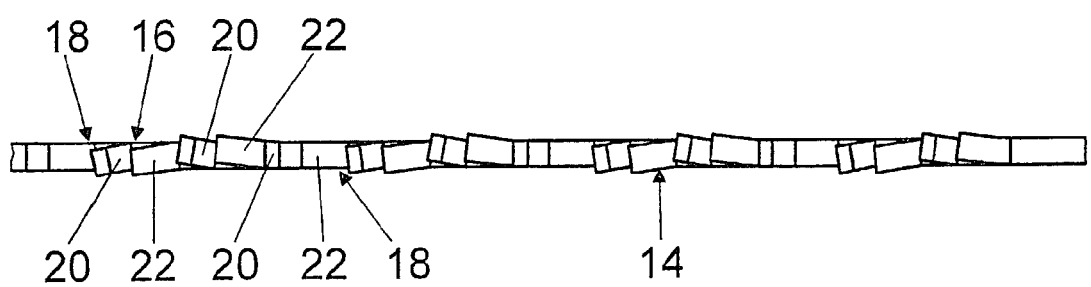
FIG. 4 shows a top view of a serration of the saw blade from FIG. 2.

Periodically, units with two teeth 20, 22 are deflected lateral to the cutting movement direction 24 by means of setting; two units deflected in opposite directions are followed by an undeflected unit (FIG. 4). If the saw blade is considered in the direction opposite the cutting movement direction 24, the roof-shaped tooth 20 of each unit is disposed in front of the standard tooth 22 (FIGS. 3 and 4).

An average of the first and second basic tooth spacing 16, 18 corresponds to a standard tooth spacing of 1.81 mm. The larger basic tooth spacing 18 is 10% greater than 1.81 mm and the smaller basic tooth spacing 16 is 10% smaller than 1.81 mm. All of the teeth 20, 22 have an effective cutting angle $\alpha$ of 5°. The standard teeth 22 have a clearance angle $\beta$ of 35°. Considered in the direction opposite the cutting movement direction 24, the roof-shaped teeth 20 have a front clearance angle $\gamma$ of 23° and a rear clearance angle $\delta$ of 33°. Other angle values deemed useful by one skilled in the art can be selected according to the material to be machined or in combination with a different basic tooth spacing.

REFERENCE NUMERALS 10 housing
12 machine tool
14 serration
16 basic tooth spacing
18 basic tooth spacing
20 roof-shaped tooth
22 standard tooth
24 cutting movement direction
26 guide unit
28 guide roller
30 tool holding mechanism
32 shaft
34 saw blade back
$\alpha$ effective cutting angle
$\beta$ clearance angle
$\gamma$ clearance angle
$\delta$ clearance angle

The invention claimed is:

1. A sabre saw blade, in particular for metal applications, with a serration (14) that has at least one first tooth spacing (16) and one second tooth spacing (18), characterized in that in at least a partial region with three successive tooth spacings (16, 18), the first and second tooth spacings (16, 18) are always disposed in a directly alternating sequence, the serration (14) has at least two tooth shapes, and at least one tooth is embodied as a roof-shaped tooth (20) having a first tooth back portion with a first clearance angle and a second tooth back portion with a second clearance angle with said tooth back portions being arranged at an obtuse angle and one behind the other in a cutting movement direction, and at least one tooth is embodied as a standard tooth (22) with a straight tooth back, arranged alternatingly, wherein the first tooth spacing is between 10% and 30% shorter and the second tooth spacing is between 10% and 30% wider than 1.81 mm.

2. The sabre saw blade according to claim 1, characterized in that in a direction counter to a cutting movement direction (24), in the partial region each second tooth spacing (18) is followed by the roof-shaped tooth (20) and each first tooth spacing (16) is followed by the standard tooth (22).

3. The sabre saw blade according to claim 1, wherein the serration has at least three units, each unit consisting of the roof-shaped tooth and the standard tooth, wherein in each of the units the roof-shaped tooth is arranged before the standard tooth counter to a cutting direction, wherein a first one of the three units is deflected transversely to the cutting movement direction, a second one of the three units which adjoins the first unit is deflected in an opposite direction to the first unit, and a third one of the three units which adjoins the second unit is not deflected.

4. The sabre saw blade according to claim 1, wherein within the partial region the roof-shaped teeth are deflected lateral to the cutting movement direction, and the standard teeth are undeflected.

5. The sabre saw blade according to claim 1, wherein an average of the first and the second tooth spacing essentially corresponds to a tooth spacing of 1.81 mm.

6. The sabre saw blade according to claim 1, characterized in that one standard tooth and one roof-shaped tooth are deflected together as a unit lateral to a cutting movement direction (24).

7. The sabre saw blade according to claim 6, characterized in that a roof-shaped tooth (20) is disposed in front of the standard tooth (22) in a direction counter to a cutting movement direction (24).

8. The sabre saw blade according to claim 6, wherein two units deflected in opposite direction are followed by an undeflected unit.

* * * * *